United States Patent [19]

Toyomura et al.

[11] Patent Number: 5,796,928
[45] Date of Patent: Aug. 18, 1998

[54] IMAGE READING APPARATUS WITH AUTOMATIC DOCUMENT FEEDER

[75] Inventors: Yuuji Toyomura, Fukuoka; Toshihumi Abe, Kitakyushu, both of Japan

[73] Assignee: Matsushita Electric Industrial Co., Ltd., Osaka, Japan

[21] Appl. No.: 388,796

[22] Filed: Feb. 15, 1995

[30] Foreign Application Priority Data

Feb. 22, 1994 [JP] Japan ................... 6-023920

[51] Int. Cl.⁶ .................... G06K 15/00; H04N 1/04; H04N 1/46
[52] U.S. Cl. ................ 395/106; 358/505; 358/486; 358/474; 358/496; 358/498
[58] Field of Search ............... 395/106.1, 112, 395/103, 109; 358/505, 498, 523, 486, 408, 474, 475, 468, 494–496, 462; 355/203, 204, 208, 209, 308, 309, 233

[56] References Cited

U.S. PATENT DOCUMENTS

| | | | |
|---|---|---|---|
| 4,447,830 | 5/1984 | Stoffel | 358/486 |
| 4,774,591 | 9/1988 | Matsunawa et al. | 358/446 |
| 4,804,841 | 2/1989 | Nakajima et al. | |
| 4,922,349 | 5/1990 | Abe et al. | 358/456 |
| 5,119,213 | 6/1992 | Graves et al. | 358/488 |
| 5,130,824 | 7/1992 | Miyakawa et al. | 358/486 |
| 5,177,626 | 1/1993 | Nosaki et al. | 358/486 |
| 5,231,513 | 7/1993 | Yokobori et al. | 358/496 |
| 5,313,312 | 5/1994 | Yamada | 358/505 |
| 5,568,270 | 10/1996 | Endo | 358/474 |

FOREIGN PATENT DOCUMENTS 9205668    4/1992    WIPO

*Primary Examiner*—Dwayne Bost
*Assistant Examiner*—Tracy M. Legree
*Attorney, Agent, or Firm*—Pollock, Vande Sande & Priddy

[57] ABSTRACT

An image reading apparatus comprises: a scanner portion, having a first line image sensor a carriage system carrying the first line image sensor; and an ADF unit, having a transporting pass for feeding a copy from a stacked copies and carrying the copy from a first end of a copy glass of the scanner and discharging the copy at a the second end of the scanner, the ADF unit further having an attribution detection portion, including a second line image sensor, for detecting an attribution of an image of the copy, such as a color image or monochrome image, or a multi-value image or binary image. According to the attribution, a reading condition such as a reading speed or the reading interval by the first line image sensor is changed. In the absence of a command signal indicative of the attribution, the first line image sensor is positioned at the second end and in the presence of the command signal, the first line image sensor is positioned at the first end. If a high resolution is required, a copy fed to the copy glass is scanned by the carriage system with a scanning speed and resolution determined by the request and the detection result of the attribution detection portion.

20 Claims, 8 Drawing Sheets

IMAGE READING APPARATUS WITH AUTOMATIC DOCUMENT FEEDER

BACKGROUND OF THE INVENTION

1. Field of the Invention

This invention relates to an image reading apparatus with an automatic document feeder for reading an image of a copy to supply an image signal.

2. Description of the Prior Art

Recently, work stations and personal computers or the like have been developed to have high performances and to be able to effect speedy processing of editing of full color images, the electric filing, and the inputting of characters through an OCR (optical character reader). With such developments, the flat bed type of color scanners have become popular and further, automatic document feeding units (hereinafter referred to as ADF) are increasingly provided to the color scanner to increase the image inputting speed and to simplify the operation.

Hereinbelow, a prior art image reading apparatus will be described with reference to the drawings. FIG. 7 is a side sectional view of the prior art image reading apparatus. In FIG. 7, numeral 1 is a body of the image reading apparatus. Numeral 2a is a copy glass for supporting a copy used when a user manually sets the copy to image reading apparatus and numeral 2b is a glass window provided at a position where a copy is read in the case of using the ADF. Numeral 3 is a carriage for scanning the copy. Numeral 4 is a supporting member having a bearing or the like fixed to the carriage 3. Numeral 5 is a shaft for supporting the carriage 3 through the supporting member 4 and the movement of the carriage 3 is limited to the sub-scanning direction by the shaft 5. Numeral 6 is a drive wire for transmitting a drive force to the carriage 3, numeral 7 is a drive pulley, and numeral 8 is a slave pulley. The carriage 3 is connected to the drive wire 6 which is looped around the drive pulley 7 and the slave pulley 8. Numeral 9 is a drive motor to which the drive pulley is coupled through a coupling shaft and a reduction gear mechanism (both are not shown), so that the carriage 3 is driven by the drive motor 9. Numeral 10 is a slave pulley supporting member, numeral 11 is a spring loaded mechanism and the slave pulley 8 is energized in the direction shown by an arrow A by the spring laded mechanism through the slave pulley supporting member 10 in order to provide a tensile force to the drive wire 6.

Numeral 12 is an ADF unit for successively transporting a copy to the reading position. Numeral 13 is a copy tray on which copies are set. Numeral 14 is a copy detection sensor for detecting the presence or the absence of the copy. Numeral 15 is a transport roller, numeral 16 is a reverse roller. Each of the copies set on the copy tray 13 is transported to the glass window 2b by the transport roller 15 and the reverse roller 16. Numeral 17 is a copy edge detection sensor for detecting the leading edge and trailing edge of the copy. Numeral 18 is a transport roller and numeral 19 is a guide roller provided confront to the transport roller 18. Numeral 20 is a transport roller for transporting the copy with the copy contacting with the glass window 2b and a distance the surface of the copy to the carriage 3 kept constant. Numeral 21 is a paper discharge tray for stacking the copies which have been read.

FIG. 8 is a partial side sectional view of an optical system of the prior art image reading apparatus shown in FIG. 7. In FIG. 8, numeral 22 is a light source lamp for illuminating a copy, numeral 23 is a copy reading portion provided to the carriage 3, numeral 24 is a reflection mirror for reflecting reflected light from the copy, numeral 25 is a color image sensor for converting optical information to an electric signal, and numeral 26 is a focusing lens for focusing an image onto the color image sensor 25.

An operation of the prior art image reading apparatus will be described. When a copy is set on the copy tray 13 of the ADF unit 12 and the copy detection sensor 14 detects the copy, the drive motor 9 in the body 1 of the image reading apparatus rotates and a drive force is transmitted to the carriage 3 through the drive pulley 7, the drive wire 6, and the slave pulley 8 to control the position of the carriage 3 such that the copy reading portion 23 of the carriage 3 is just under the glass window 2b. In this system, the image is read by transporting the copy by the ADF unit 12 with the position of the carriage 3 fixed.

In this condition, when an external host computer (not shown) supplies a copy reading command thereto, the light source lamp 22 is turned on and an ADF drive motor (not shown) separately provided from the ADF unit 12 is rotated. The transport roller 18 and the guide roller 19 is coupled to the ADF drive motor through a reduction gear mechanism, so that the transport roller 18 and the guide roller 19 begin to rotate with the rotation of the ADF drive motor. When a rotation speed of the ADF drive motor reaches a constant speed, a clutch mechanism (not shown) is controlled to rotate the transport roller 15 and the reverse roller 16 to transport every copy set on the copy tray 13. The reverse roller 16 suppresses so-called multiple transportation, that is, it prevents that a plurality of copies are transported at the same time.

When the leading edge of the copy transported is detected by the copy edge detection sensor 17, the transmitting of the drive force to the transport roller 15 and the reverse roller 16 is stopped by controlling the clutch mechanism. At this instant, the copy is pitched between the transport roller 18 and the guide roller 19 and hereinafter, the copy is transported by the transport roller 18 and the transport roller 15 acts as a tension roller.

Further, the detection of the leading edge of the copy by the copy edge detection sensor 17 is used for a start timing of the reading of an image.

The transported copy is illuminated by the light source lamp 22 through the glass window 2b. The reflected light from the copy is reflected by the reflection mirror 24 and focused on the color image sensor 25 by the focusing lens 26, and is converted into an electric signal by the color image sensor 25.

On the other hand, when the trailing edge of the copy is detected by the copy edge detection sensor 17 and the copy detection sensor 14 detects a next copy, the clutch mechanism is controlled again, the transport roller 15 and the reverse roller 16 is rotated to start the transportation of the next copy set on the copy tray 13.

The copies stacked on the copy tray 13 are transported to the glass window 2b successively by repeating the operation mentioned above and the images are read.

In color scanners, the monochrome (binary image) images do not require continuous tone reproducibility, so that the charge accumulating interval of the image sensor is set to be short. Moreover, only one color signal (for example, a green signal) generated from the image focused on the image sensor is subjected to a binary processing. Therefore, it can be read at a higher speed than the color copies.

However, in the prior art image reading apparatus, it is necessary that the user sets an attribution of the copy whether the image to be read is color or monochrome (binary) to the prior art image reading apparatus in advance.

SUMMARY OF THE INVENTION

The aim of the present invention is to provide an improved image reading apparatus.

According to the present invention there is provided an image reading apparatus comprising: a scanner portion, having a first line image sensor, a carriage system for carrying the first line image sensor; and an ADF unit, having a transporting pass for feeding a copy from stacked copies and carrying the copy from a first end of a copy glass of the scanner and discharging the copy at a second end of the scanner, the ADF unit further having an attribution detection portion, including a second line image sensor, for detecting an attribution of an image of the copy, such as a color image or monochrome image, or a multi-value image or binary image. According to the attribution, a reading speed or the reading interval by the first line image sensor is changed. In the absence of a command signal indicative of the attribution, the first line image sensor is positioned at the second end and in the presence of the command signal, the first line image sensor is positioned at the first end. If a high resolution is required, a copy fed to the copy glass is scanned by the carriage system from the second end with a scanning speed and resolution determined by the request and the detection result of the attribution detection portion.

According to the present invention there is also provided an image reading apparatus for outputting an image signal comprising: a transporting portion, having a transporting pass, for transporting a copy along the transporting pass in a sub-scanning direction at a predetermined feeding rate; a first image reading portion, provided on the way of the transporting pass for reading an image on the copy through scanning the image in a main scanning direction at a cycle to produce the image signal; a second image reading portion, provided on the way of the transporting pass upstream from the first image reading portion, for reading the image; an attribution detection portion for detecting an attribution of the image on the basis of an output of the second image reading portion; and a control portion for changing the cycle in accordance with the detected attribution. In accordance with the detected attribution, the feeding rate may be changed. After the detection of the attribution, the first image reading portion may read the image to produce the image signal through scanning in the sub-scanning direction by a carriage wherein a scanning speed in the sub-scanning direction is changed in accordance with the detected attribution. Further, a resolution of the scanning may be changed in the scanning by the carriage in accordance with a resolution command signal in addition to the attribution.

The attribution is detected with respect to whether the image is a color image or a monochrome image, or a multi-value image or a binary image.

When the attribution is detected, the first and second image reading portions are separated more than a maximum length of the copy in the sub-scanning direction at the start of timing of image reading. Therefore, the carriage is positioned at an end position of a carriage stroke far from the second image reading portion.

When the attribution is not detected, or a command signal indicative of the attribution is inputted, the first image reading portion is positioned at the other end position of the carriage stroke nearest to the second image reading portion to provide an accurate image reading.

According to this invention there is further provided an image reading apparatus for outputting an image signal comprising: a transporting portion, having a transporting pass, for transporting a copy along the transporting pass in a sub-scanning direction; a scanning unit, provided on the way of the transporting pass, having a first image reading portion, for scanning the copy on the transporting pass transported by the transporting portion in the sub-scanning direction by the first image reading portion, the first image reading portion reading an image on the copy through scanning the image in a main scanning direction in accordance with a reading condition to produce the image signal; a second image reading portion, provided upstream of the transporting pass from the scanning unit, for reading the image on the copy being transported by the transporting portion; an attribute detection portion for detecting an attribution of the image on the basis of an output of the second image reading portion; and a control portion for changing the reading condition in accordance with an output of the attribution detection portion.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
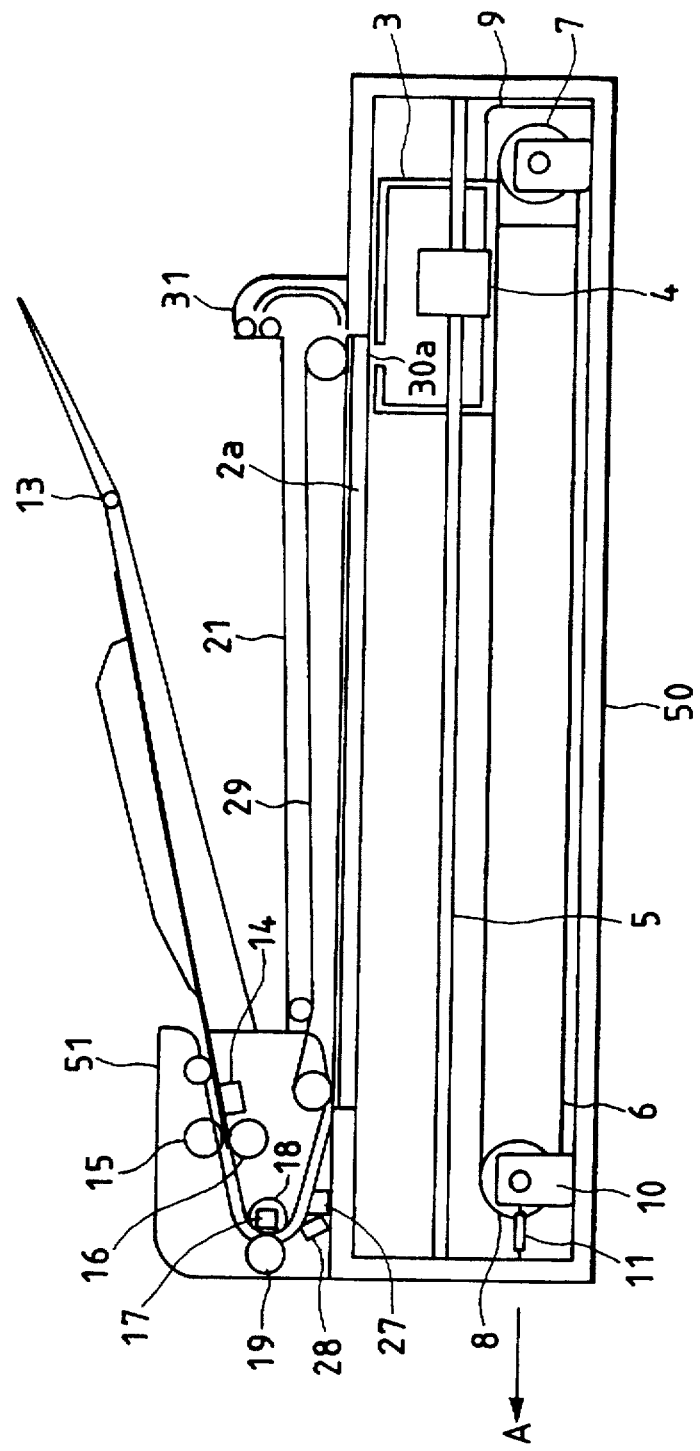
FIG. 1 is a side sectional view of an image reading apparatus of an embodiment of this invention.

Hereinbelow will be described a first embodiment of this invention with reference to the drawings. FIG. 1 is a side sectional view of an image reading apparatus of an embodiment of this invention. Here, the same members as those use in the prior art are designated with the same references. In FIG. 1, numeral 50 is a body of an image reading apparatus and numeral 51 is an ADF unit fixed to the body 50 of the image reading apparatus. Numeral 27 is an image sensor, arranged inside of the ADF unit 51, for reading an image of a copy to detect an attribution of the copy. Numeral 28 is a light source such as a fluorescent lamp. Numeral 29 is a copy transport belt for transporting the copy on a copy glass 2a. Numeral 30a is a copy reading position where the copy is read. Numeral 31 is a copy discharge portion for discharging the copy which has been read. Numeral 3 is a carriage for scanning the copy. Numeral 4 is a supporting member having a bearing or the like fixed to the carriage 3. Numeral 5 is a shaft for supporting the carriage 3 through the supporting member 4 and the movement of the carriage 3 is limited to the sub-scanning direction by the shaft 5 to provide a scanning stroke of the carriage. Numeral 6 is a drive wire for transmitting a drive force to the carriage 3, numeral 7 is a drive pulley, and numeral 8 is slave pulley. The carriage 3 is connected to the drive wire 6 which is looped via the drive pulley 7 and the slave pulley 8. Numeral 9 is a drive motor to which the drive pulley is coupled through a coupling shaft and a reduction gear mechanism (both are not shown), so that the carriage 3 is driven by the rotating drive motor 9. Numeral 10 is a slave pulley supporting member, numeral 11 is a spring loaded mechanism and the slave pulley 8 is energized in the direction shown by an arrow A by the spring loaded mechanism through the slave pulley supporting member 10 in order to provide a tensile force to the drive wire 6.

The ADF unit 51 successively transports the copy to the copy glass 2a. Numeral 13 is a copy tray on which copies are set. Numeral 14 is a copy detection sensor for detecting the presence or the absence of the copy. Numeral 15 is a transport roller, numeral 16 is a reverse roller. Each of the copies set on the copy tray 13 is transported to the glass window 2a by the transport roller 15 and the reverse roller 16. Numeral 17 is a copy edge detection sensor for detecting the leading edge and trailing edge of the copy. Numeral 18 is a transport roller and numeral 19 is a guide roller provided to confront to the transport roller 18. Numeral 21 is a paper discharge tray for stacking the copies which have been read.

Figure 2:
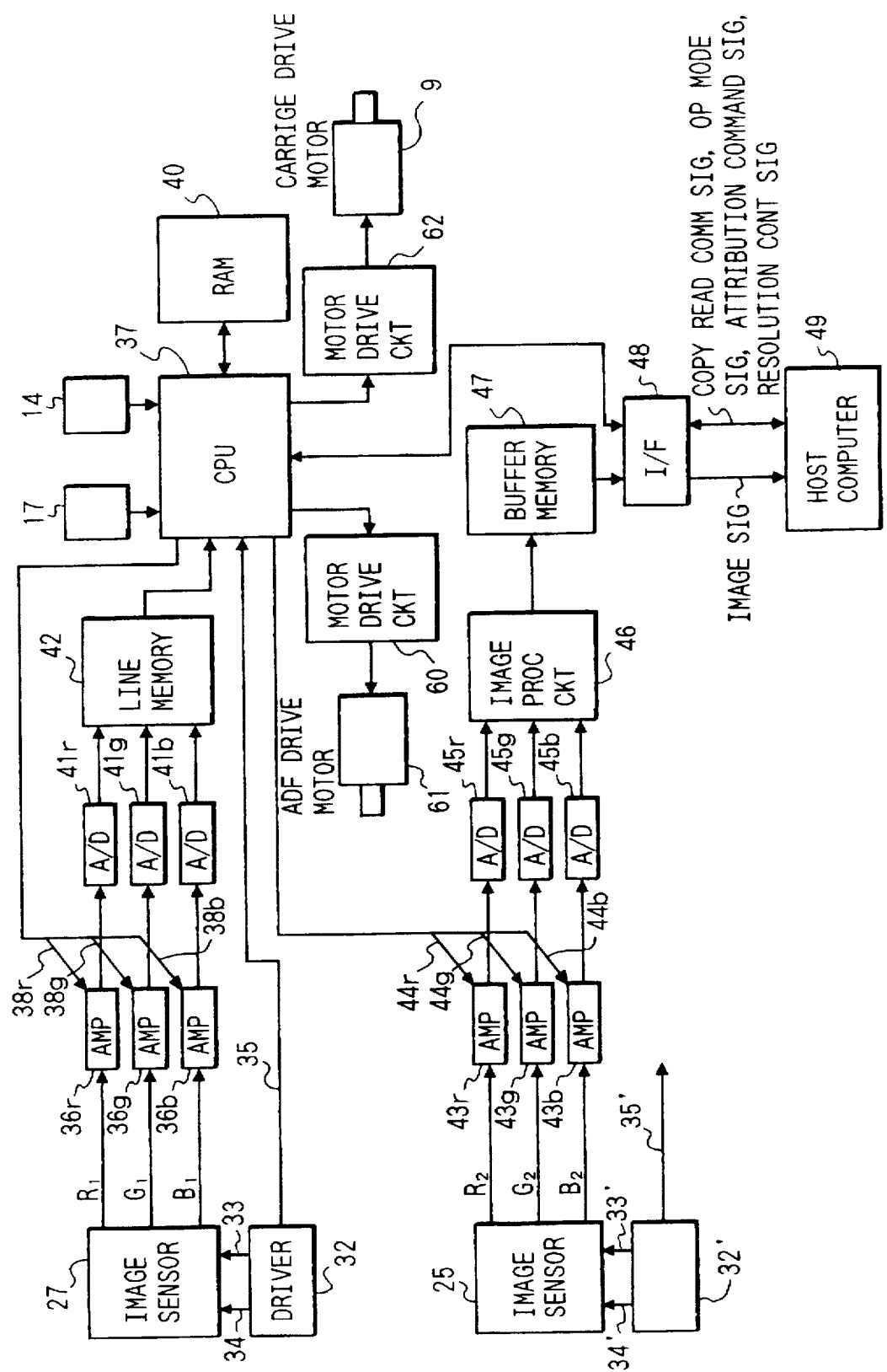
FIG. 2 is a block diagram of the image reading apparatus with a copy attribution judging function of the embodiment of the invention.

FIG. 2 is a block diagram of the image reading apparatus with a copy attribution judging function of the embodiment of the invention. In FIG. 2, numeral 32 is a driver for producing a driving signal supplied to the image sensor 27, a line synchronizing signal 33, and image area signal 35. The image sensor 27 reads outputs of the image data per line, every line synchronizing signal 33 with a cycle which is controllable. Numeral 34 is a pixel clock. The signal corresponding to each pixel of the image sensor 27 is outputted in phase with the pixel clock 34 from the image sensor 27. The image area signal 35 is indicative of a period for which the image signals R1, G1, and B1 are actually outputted, supplied in phase with the line synchronizing signal 33, produced by counting the pixel clocks by the driver 32. Numerals 36r, 36g, and 36b are amplifiers for independently amplifying and adjusting the levels of respective R, G, and B signals outputted from the image sensor 27 in accordance with gain control signals 38r, 38g, and 38b. Outputs of the amplifiers 36r, 36g, and 36b are converted into digital signals by A/D converters 41r, 41g, and 41b respectively. Outputs of the A/D converters 41r, 41g, and 41b are temporally stored in line memory circuit 42. An output of the line memory 42 is supplied to a CPU (central processing unit) 37. The CPU 37 affects the controlling of the image reading apparatus.

The CPU 37 outputs the gain control signals 38r, 38g, and 38b to control gains of the amplifiers 36r, 36g, and 36b. In fact, in order to adjust the gains, D/A converters for converting digital values from the CPU 37 into analog levels for controlling the amplifiers 38r, 38g, and 28b may be necessary. However, they are omitted in the block diagram.

Numeral 32' is a driver for producing drive signals supplied to the image sensor 25 and a line synchronizing signal 33'. The image sensor 25 reads and outputs the image data per line, every line synchronizing signal 33'. Numeral 34' is a pixel clock. The signals corresponding to pixels of the image sensor 25, i.e., image signals R2, G2, and B2 are outputted in phase with the pixel clock 34' from the image sensor 25. Numeral 35' is an image area signal, indicative of a period for which the image data is actually outputted, supplied in phase with the line synchronizing signal 33', produced by counting the pixel clock signal by the driver 32'. Numerals 43r, 43g, and 43b are amplifiers for independently amplifying and adjusting the levels of respective R, G, and B signals outputted from the image sensor 25 in accordance with gain control signals 44r, 44g, and 44b. Outputs of the amplifiers 44r, 44g, and 44b are converted into digital signals by A/D converters 45r, 45g, and 45b respectively. Outputs of the A/D converters 45r, 45g, and 45b are supplied to an image processing circuit 46 for affecting a normalization (shading compensation), color correction, resolution conversion or the like. An output of the image processing circuit 46 is supplied to a buffer memory 47 for temporarily storing the output of the image processing circuit 46. An output of the buffer memory 47 is supplied to a host computer 49 through an interface circuit 48. The interface circuit 48 receives a start signal, an attribution signal, a resolution control signal, or other control or conditional signals from the host computer 49. The host computer 49 also receives conditional signals from the CPU 37 through the interface circuit 48.

The CPU 37 controls a motor drive circuit 60 and the ADF drive motor 61 rotates under control of the CPU 37. With the rotation of the ADF drive motor 61, the transport rollers 15 and 18, and the copy transport belt 29 rotate. The CPU 37 also controls a motor drive circuit 62 and the carriage drive motor 9 rotates under control of the CPU 37 to move the carriage 3.

An operation of the image reading apparatus of this embodiment will be described.

When a copy is set on the copy tray 13 of the ADF unit 51 and the copy detection sensor 14 detects the copy, the carriage drive motor 9 in the body 50 of the image reading apparatus rotates and a drive force is transmitted to the carriage 3 through the drive pulley 7, the drive wire 6, and the slave pulley 8. The position of the carriage 3, which has been moved on the side of the slave pulley 8 when the copy was not set on the copy tray 13, is controlled such that the copy reading portion 23 of the carriage 3 is just under the copy reading position 30a. That is, the carriage 3 is positioned at a far end of the carriage stroke defined by the drive pulley 7 and the slave pulley 8, the copy glass 2a, or the shaft 5. The reason why the carriage 3 is moved on the side of the slave pulley 8 and reads an image on the copy from the side of the slave pulley 8 when the copy is not set on the copy tray 13, is that the setting directions of the copy between the case where the user sets copies on the copy tray 13, and the case where the user sets a copy on the copy glass 2a agree with each other. In this operation, the image is read by transporting the copy by the ADF unit 51 with the position of the carriage 3 fixed.

In this condition, when an external host computer 49 supplies a copy reading command (start) signal thereto, the light source lamp 22 (FIG. 5) and the light source 28 inside the ADF unit 51 are turned on and an ADF drive motor 61 separately provided from the ADF unit 51 is rotated. The rotation speed of the ADF drive motor 61 at the start-up is set to a rotation speed such that the copy is transported at a high speed about twice the color image reading speed. The transport roller 18 and the guide roller 19 is coupled to the ADF drive motor 61 through a reduction gear mechanism (not shown), so that the transport roller 18 and the guide roller 19 begin to rotate with the rotation of the ADF drive motor 61. When a rotation speed of the ADF drive motor 61 reaches a constant speed, a clutch mechanism (not shown) is controlled to rotate the transport roller 15 and the reverse roller 16 to transport every copy set on the copy tray 13. The reverse roller 16 suppresses the so-called multiple transportation, that is, it prevents transportation of a plurality of copies at the same time, by utilizing the difference in the friction between the roller and the surface of the copy.

When the leading edge of the copy transported is detected by the copy edge detection sensor 17, the transmitting of the drive force to the transport roller 15 and the reverse roller 16 is stopped by controlling the clutch mechanism. At this instant, the copy is pinched between the transport roller 18 and the guide roller 19 and hereinafter, the copy is transported by the transport roller 18 and the transport roller 15 acts as a tension roller.

Further, the leading edge of the copy is detected by the copy edge detection sensor 17. In response to this, timing of the reading of an image by the image sensor 27 for detection of the copy attribution and the timing by the image sensor 25 are determined.

The CPU 37 detects the attribution of the copy from the copy tray 13 using the image signals R1, G1, and B1. That is, the image of the copy read by the image sensor 27 is judged whether it is a color image (multi-value image)/a monochrome image (multi-value image), or a monochrome image (binary image). Here, an operation of the copy attribution judging portion will be described in detail.

A white calibration tape (not shown) is adhered to a portion of the transporting pass of the copy to which the image sensor 27 inside the ADF unit 51 confronts. The line synchronizing signal 33 and the pixel clock 34 are always outputted while the supply power to this image reading apparatus is supplied, so that the image sensor 27 always outputs image signals R1, G1, and B1.

At first, at an initialization and a suitable timing when the image reading apparatus is not operated to read a copy, the CPU 37 sets the gain control signals 38r, 38g, and 38b such that the amplifiers 36r, 36g, and 36b have standard values of predetermined gains and turns on the light source 28. Therefore, an output of the image sensor 27 of the white calibration tape (a white level) is inputted into the CPU 37. Then, the CPU 37 monitors signal levels from the amplifiers 36r, 36g, and 36b and change the setting values of the gain control signals 38r, 38g, and 38b such that respective signal levels are equalized and made large. Generically, an error in the detection of the white level is smaller than the black levels obtained when the light source 28 is turned off, so that the gain adjustments of the amplifiers 36r, 36g, and 36b are affected for only the white level. However, it is better that for a more accurate adjustment, offset values of the amplifiers 36r, 36g, and 36b are determined by inputting the black levels for example. Similarly, the calibration to the image sensor 25 is affected through the gain control signal 44r, 44g, and 44b by the CPU 37.

The image sensor 27 is always supplied with the line synchronizing signal 33 from the driver as mentioned above and the image sensor 27 outputs analog image signals R1, G1, and B1 in phase with the pixel clock 34. The analog image signals R1, G1, and B1 are amplified by the amplifiers 36r, 36g, and 36b and converted into digital image signals by the a/d converters 41r, 41g, and 41b which are stored in the line memory 42 in phase with the pixel clock 34.

In this embodiment, the line synchronizing signal 33 is outputted every 10 msec period and the pixel clock 34 is outputted every about 4.8 μs period. Then, it is assumed that the number of the pixels of the image sensor 27 is 1654 (A4 size, 200 dpi), the transmission of the image data outputted in phase with the pixel clock 34 to the line memory 42 is terminated for about 8 msec per line.

On the other hand, the transporting speed of the copy is set to 50 mm/sec and the line synchronizing signal 33 is outputted every 10 msec. Therefore, the copy is transported 0.5 mm during the reading of one line. While the copy is being transported, that is the image area signal 35 is outputted, the CPU 37 monitors levels of the R, G, and B signals.

When the leading edge of the copy transported along the transporting pass in the ADF unit 51 is detected, the CPU 37 permits the interruption by the image area signal 35.

Figure 6:
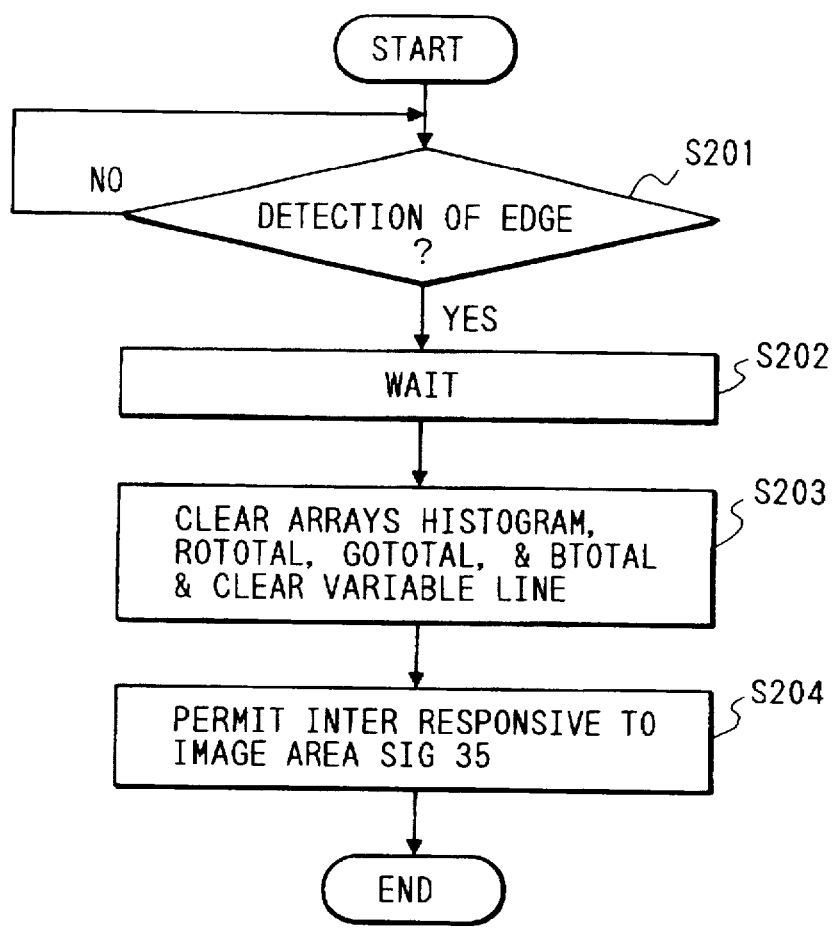
FIG. 6 shows a flow chart of this embodiment showing this interruption permission operation.
Figure 7:
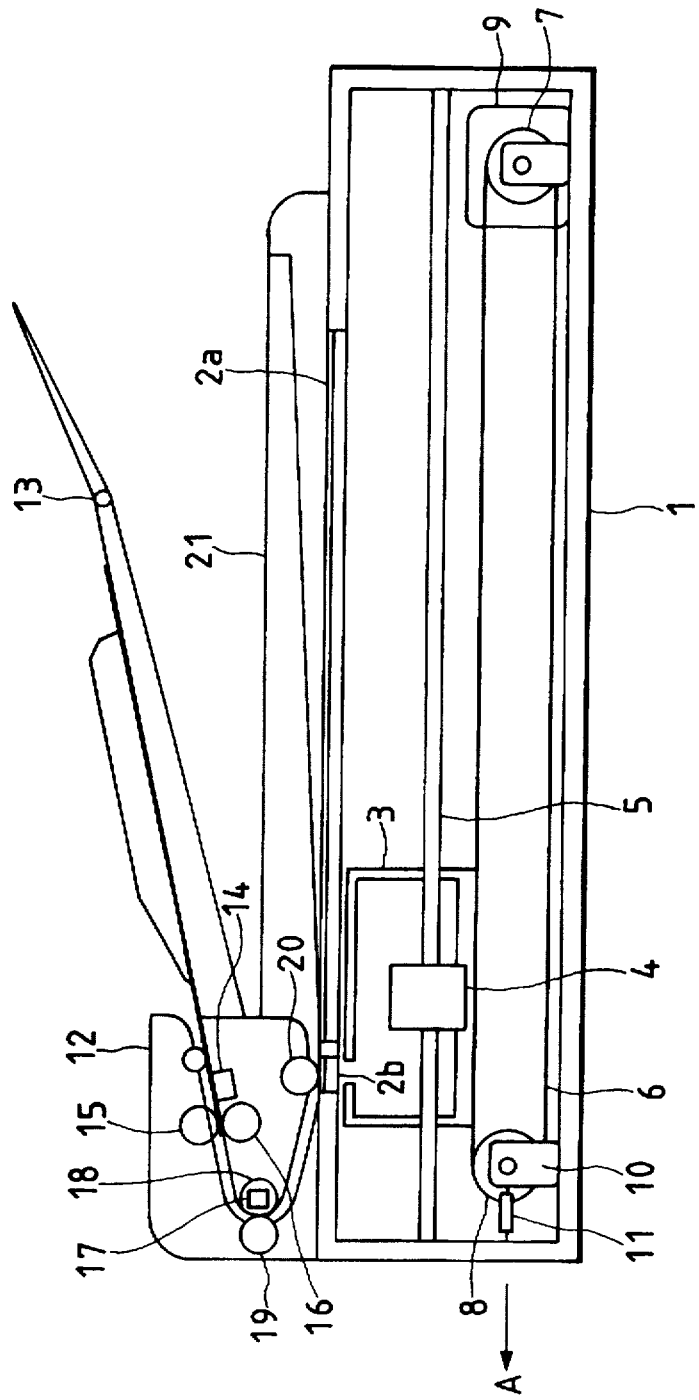
FIG. 7 is a side sectional view of a prior art image reading apparatus.
Figure 8:
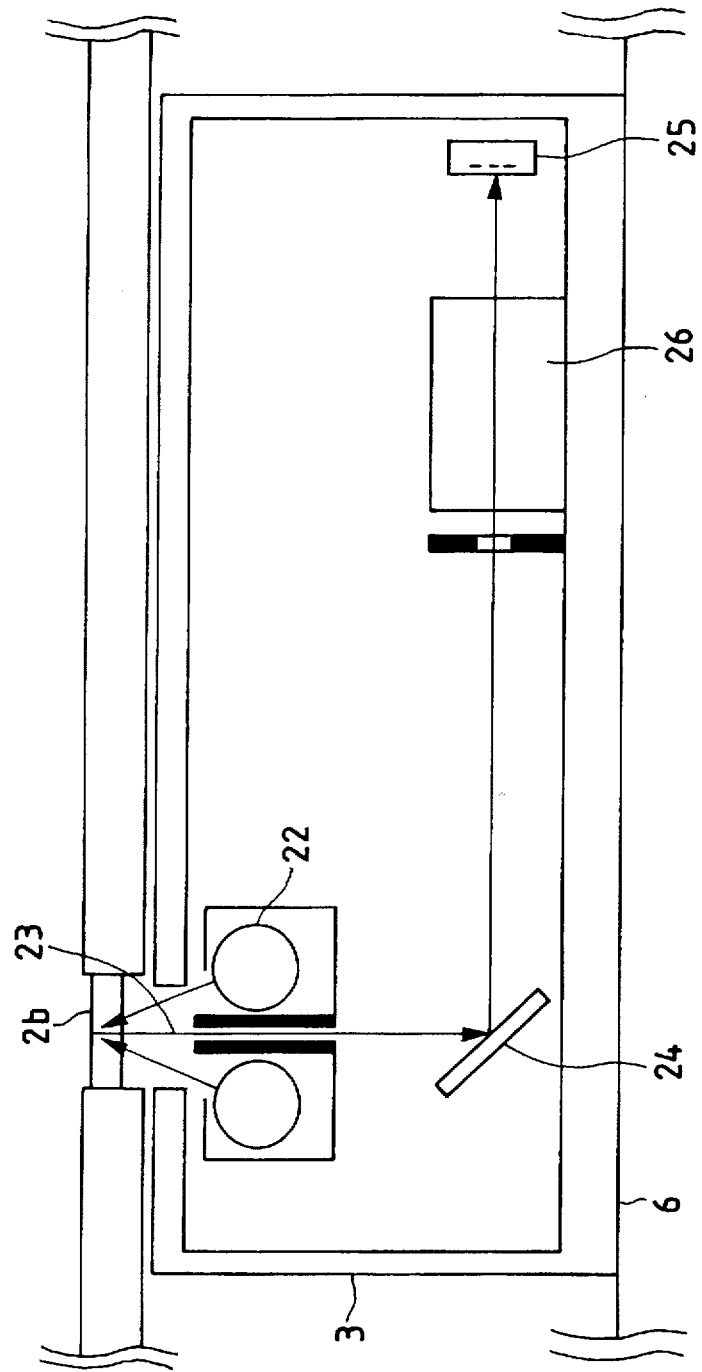
FIG. 8 is a partial side sectional view of an optical system of the prior art image reading apparatus shown in FIG. 7.

FIG. 6 shows a flow chart of this embodiment showing this interruption permission operation. In the first step S201, the CPU 37 waits until the edge detection sensor 17 detects the leading edge of the copy. If the edge detection sensor 17 detects the leading edge of the copy, the CPU 37 waits for a predetermined interval for the arrival of the copy to the image sensor 27. After the predetermined interval, the CPU 37 affects initialization of internal variables necessary for the judging processing of attribution of the image of the copy in step S203. That is, the CPU 37 clears an array Histogram [16] for classifying values of the image signals into a plurality of levels by 0, wherein the number in the bracket indicates the number of array elements necessary for classifying data of image signals by the upper four bits. Then, the CPU 37 clears arrays Rtotal[103], Gtotal[103], and Btotal[103] for accumulating the image data of the image signals. Here, the number of "103" means the number of samples in the case that the 1654 pixels per line are sampled every 16 pixels. That is, it means 1654/16=103 samples (the figures below decimals are omitted). Then, a variable Line indicative of the number of lines which have been processed is cleared by 0. In the following step S204, an interruption responsive to the image area signal 35 is permitted and then, this processing ends.

In the image attribution judging processing of this embodiment, a first processing is executed such that R1, G1, and B1 values of the image signals read by the image sensor 27 are measured periodically, a histogram is produced in accordance with the degrees of occurrence of values, and a judgement whether a multi-value or binary image is made. A second processing is executed such that mean values of the image signal obtained by periodically sampling the output image from the image sensor 27 are calculated and the mean values of R1, G1, and B1 are compared with each other to judge whether the image is a color image or a monochrome image is made. The image attribution judging processing will be described more specifically.

The image area signal indicates a period for which image signals are actually transmitted every line and shows a logic H level during the outputting the image signals and a logic L level when the transmission of the image data is finished. In the CPU 37, the interruption responsive to the image area signal 35 is permitted, so that the interruption occurs in response to the transition of the image area signal 35 from H to L.

Here, the period of the line synchronizing signal is 10 msec and the period for which the image data from the image sensor 27 is outputted is 8 msec, so that, all image data of a line has been stored in the line memory 42 when the interruption responsive to the image area signal is received by the CPU 37. The CPU 37 executes the image attribution judging processing for a period of 2 msec for which the image data is not transmitted.

Here, the image data in the line memory 42 is assumed or expressed as data in the arrays. That is, the values in the line memory are stored in arrays r[0] to r[1653], g[0] to g[1653], and b[0] to b[1653].

Figure 5:
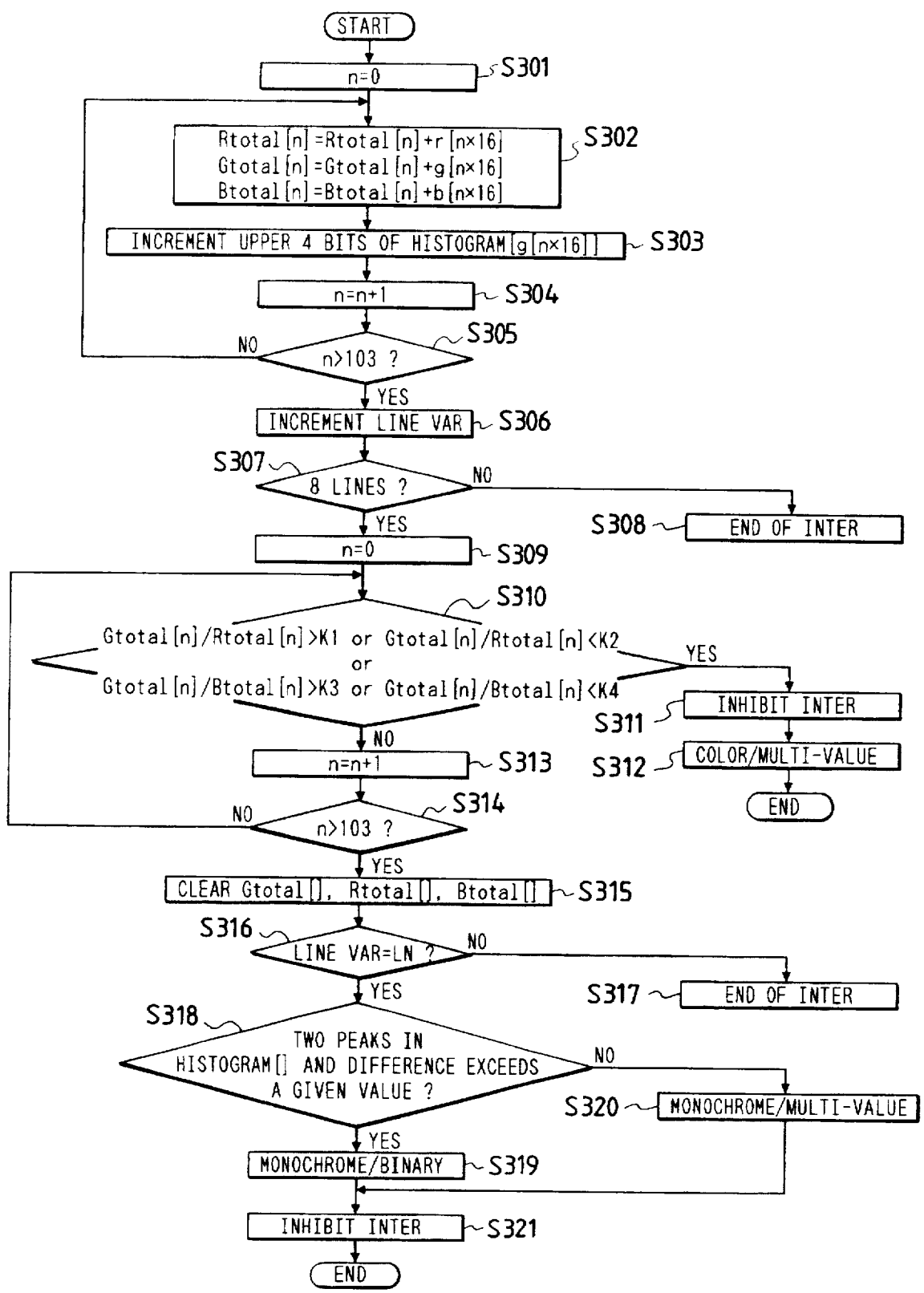
FIG. 5 shows a flow chart of this embodiment of the image attribution judging processing.

FIG. 5 shows a flow chart of this embodiment of the image attribution judging processing.

In step s301, the CPU 37 clears the local variable n which is used for periodical sampling of the image data in one line. In step s302, the CPU 37 samples the image data in one line with a period of 16 pixels and accumulates the values of every colors. That is, Rtotal[n]=Rtotal[n]+r[n×16]
Gtotal[n]=Gtotal[n]+g[n×16]
Btotal[n]=Btotal[n]+b[n×16]

where n×16 shows the sampling with the period of 16 pixels. This processing is a portion of the second processing.

In step s303, only the green signal G(Green) is used because it has the highest correlation with the luminance information of the image of the copy or it most accurately reflects the luminance information. The CPU 37 classifies the G data into 16 classes every reading of data of one pixel and then, an increment of the array Histogram[] is executed. For example, if the value of the upper four bits of G data is represented as 0000 (binary), the increment of the array Histogram [0] is affected and if the value is represented as 0011 (binary), increment of Histogram [3] is affected. This processing is a portion of the first processing.

In step s304, the local variable n is increased by one. In step s305, the CPU 37 makes a decision whether a processing of one line has been finished, that is, whether the variable n reaches "103". If NO, processing returns to step s302. If YES, processing proceeds to step s306. In step s306, the CPU 37 increases the line variable and checks whether the line variable reaches 8 in step s307. If NO, the CPU 37 finishes the interruption processing in step s308. If YES, processing proceeds to step s309.

In step s309, the CPU 37 clears the local variable n. In the following step s310, the CPU 37 compares the image data of red, green, and blue each other. That is, the CPU 37 makes a decision as to whether Btotal[n]/Rtotal[n]>K1, Gtotal[n]/Rtotal[n]<K2, Gtotal[n]/Btotal[n]>K3, or Gtotal[n]/Btotal[n]>K4. In this embodiment, these constants are determined that K1=1.3, K2=0.7, K3=1.3, and K4=0.7. If any of these inequalities are satisfied, processing proceeds to step s311. In step s311, the CPU 37 inhibits the interruption responsive to the image area signal 35 and judges the image of the copy as the dolor/multi-value image in step s312. Here, during the image attribution judging processing, if the image of the copy is judged as the color image, the image attribution judging processing is finished.

If the answer is NO in the step s310, the CPU 37 increases the local variable n by one. In step s314, the CPU 37 checks whether or not judgement for accumulated values for all 103 data have been finished. If NO, processing returns to step s310. If Yes, processing proceeds to step s315.

In step s315, the CPU 37 clears array Rtotal[], Gtotal[], and Btotal[]. In the following step s316, the CPU 37 checks whether or not the line variable reaches a predetermined number of lines LN. If NO, processing proceeds to step s317 and ends the interruption processing. Here, the predetermined number of lines is determined by the length in the sub-scanning direction, i.e., the copy feeding direction. In this embodiment, the copy is scanned through 594 lines wherein one line is 0.5 mm and the length of the copy is 294 mm, namely, A4 size. If the line variable reaches the predetermined number of lines, processing proceeds to step s318.

In step s308, the CPU 37 checks the distribution of the image data in the array Histogram[]. The array Histogram[] includes 16 elements and the CPU 37 checks value from Histogram[0] to Histogram[15] successively to detect peaks, levels of peaks, and a minimum level. Then, the CPU 37 makes a decision as to whether there is two peaks and a difference between the peak level and the minimum level is larger than a predetermined value. If NO, the CPU 37 judges the image as the monochrome/multi-value image in step s320. If YES, the CPU 37 judges the image as the monochrome/binary image in step s319. After processing in steps s319 and s320, the CPU 37 inhibits the interruption responsive to the image area signal 35 and ends the processing. Here, the judgement whether the image is color or monochrome is made after the whole image of the copy has been read.

The leading edge of the copy which have passed the image sensor 27 is transported to the copy transport belt 29 and then, transported to the copy reading position 30a along the copy glass 2a.

When the trailing edge of the copy passes the image sensor 27 and the reading of the copy by the image sensor 27 and the copy attribution judgement are finished, the copy does not reach the copy reading portion 23 of the carriage 3. That is, the copy has not reached the copy reading portion 30a of the body 50 of the image reading apparatus yet.

Here, generally, in the case that a monochrome (binary image) is read by a color scanner, a charge accumulating interval of the color image sensor 25, namely, a cycle in the main scanning direction, is set to be relatively short because the monochrome (binary image) does not require the continuous tone reproducibility. Moreover, it is sufficient to selectively affect the binary processing to a specific color, for example, a green signal, out of the image signals from the color image sensor 25, so that the monochrome image copy can be read at a high speed than the color image copy.

The initial setting value of the transport speed of the copy of the ADF unit 51 is set to the reading speed for the monochrome image copy. For example, the copy is transported at a transport speed of 50 mm/sec. If the judgement result of the copy attribution by the CPU 37 indicates the monochrome (binary image) image copy, the transport speed of the ADF unit 51 does not change and the copy is read at the copy reading position 30a. On the other hand, if the judgement result of the copy attribution by the CPU 37 indicates the color image (multi-value image) copy, the transport speed of the ADF unit 51 is reduced to a transport speed of about 25 mm/sec. That is, the CPU 37 controls the motor drive circuit 60 to reduce the rotation speed of the ADF drive motor 61 and after the transport speed becomes constant, the copy is transported by the copy transport belt 29 and passes the copy reading position 30a. As mentioned, a color image copy can be read with a high continuous tone reproducibility by reducing the transport speed of the ADF unit 51 to increase the charge accumulating interval. Therefore, the charge accumulating interval of the color image sensor 25 is set to a value about twice that of the monochrome image copy. The copy which has been read is discharged from the copy discharging portion 31.

On the other hand, when the trailing edge of the copy is detected by the copy edge detection sensor 17 and the copy detection sensor 14 detects a next copy, the CPU 37 increases the transport speed to 50 mm/sec again. When the rotation speed of the ADF drive motor reaches the constant speed, the clutch mechanism is controlled again. Then, the transport roller 15 and the reverse roller 16 are rotated to start the transportation of the copies set on the copy tray 13.

The copies stacked on the copy tray 13 are transported to the copy reading position 30a successively with the image attribution judged by the image sensor 27 by repeating the operation mentioned above and the images are read.

As mentioned, a first operation mode of the image reading apparatus of this invention is described. Then, an operation in the case that a reading mode is commanded externally will be described.

The image reading apparatus is connected to an external host computer 49 to supply the read image data to the host computer 49 through the interface circuit 48 and further can receive a copy read command signal, the operation mode signal, attribution command signal, a resolution control signal, a command signal of the reading area.

Figure 3:
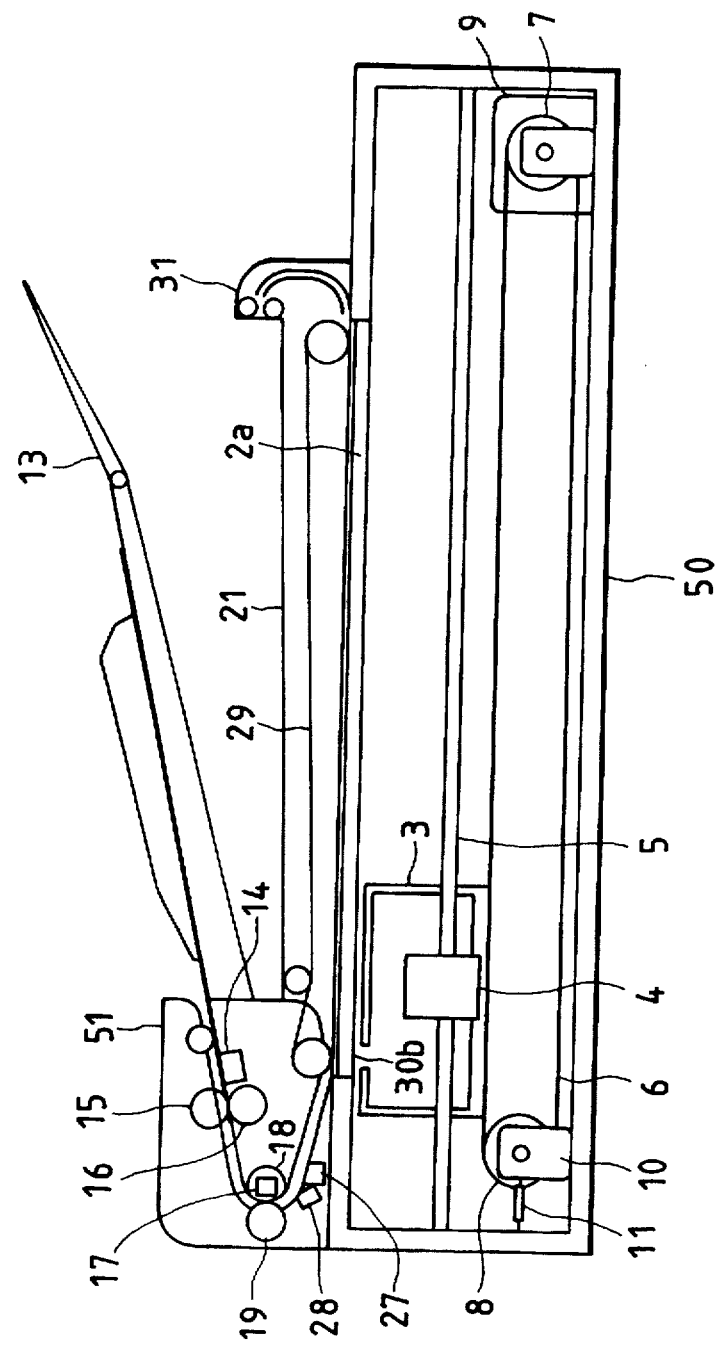
FIG. 3 is an illustration showing an operation in a second operation mode of the image reading apparatus of the embodiment of this invention.

FIG. 3 is an illustration showing an operation in a second operation mode of the image reading apparatus of the embodiment of this invention. The reading operation in the second operation mode will be described. In FIG. 3, numeral 30b is a copy reading position in the second operation mode. The other structures are similar to the first operation mode of the image reading apparatus mentioned above, so that a detailed description is omitted.

The host computer 49 sends the operation mode signal indicative of the second operation mode and the attribution command signal to the CPU 37 through the interface circuit 48. When a copy is set on the copy tray 13 of the ADF unit 51 and the copy detection sensor 14 detects the copy, the drive motor 9 of the body 50 of the image reading apparatus is rotated, the drive force is transmitted to the carriage 3 through the drive pulley 7, the drive wire 6, and the slave pulley 8 such that the copy reading portion 23 of the carriage 3 moves to a position just under the copy reading position 30b. In this system, the image is read through the transporting the copy by the ADF unit 51 with the position of the carriage 3 fixed.

In this condition, when the copy read command is transmitted from the host computer 49, the light source lamp 22 in the carriage 3 is turned on and at the same time, the ADF drive motor 61 provided separately from the ADF unit 51 is rotated. The rotation speed of the ADF drive motor 61 is set to the transport speed in accordance with the attribution indicated by the attribution command signal from the host computer 49 before the ADF unit 51 is started up. The transport roller 18 and the guide roller 19 are coupled to the ADF drive motor 61 through the reduction gear mechanism (not shown), so that the transport roller 18 and the guide roller 19 start to rotate with the rotation of the ADF drive motor 61. When the rotation speed of the ADF drive motor 61 reaches a constant speed, the clutch mechanism (not shown) is controlled to rotate the transport roller 15 and the reverse roller 16 to transport every copy set on the copy tray 13. The reverse roller 16 suppresses the so-called multiple transportation, that is, prevents transporting of a plurality of copies at the same time, by utilizing the difference in the friction between the roller and the surface of the copy.

Here, if the CPU 37 receives the attribution command signal and then, receives the copy reading command signal, the carriage 3 is carried to the reading position 30b. Further, if the CPU 37 receive the attribution command signal and then, the copy detection sensor 14 detects the copy, the carriage 3 is also carried to the reading position 30b. In other words, if the CPU 37 receives the copy reading command signal and the CPU 37 receives no attribution command signal, namely in the first operation mode, the carriage 3 is carried to the reading position 30a. Further, if the copy detection sensor 14 detects the copy and the CPU 37 receives no attribution command signal, namely in the first operation mode, the carriage 3 is also carried to the reading position 30a as mentioned earlier. Moreover, if the CPU 37 receives the operation mode signal indicative of the second operation mode, the carriage is fixedly positioned at the reading position 30b until the other operation mode is commanded.

When the leading edge of the copy transported is detected by the copy edge detection sensor 17, the transmitting of the drive force to the transport roller 15 and the reverse roller 16 is stopped by controlling the clutch mechanism (not shown). At this instant, the copy is pinched between the transport roller 18 and the guide roller 19 and hereinafter, the copy is transported by the transport roller 18 wherein the transport roller 15 acts as a tension roller.

Further, the leading edge of the copy is detected by the copy edge detection sensor 17. In response to this, a start timing of the reading of an image by the image sensor 25 is set.

The leading edge which has passed the copy edge detection sensor 17 is transported to the copy transport belt 29 and then, transported to the copy reading position 30b along the copy glass 2a. This copy is read at the copy reading portion 30b and the copy which has been read is discharged from the copy discharge portion 31.

As mentioned above, in the second operation mode, the copy attribution judgement by the image sensor 27 is not executed. Therefore, the user commands the copy attribution by the user using the host computer 49 in advance.

Here, the start timing of the reading of a copy by the image reading apparatus is provided in response to the detection of the leading edge of the copy by the copy edge detection sensor 17. In the second operation mode, the distance between the copy edge detection sensor 17 and the copy reading position 30b is less than that in the first operation mode by more than 200 mm (approximately a half of the copy glass 2a), so that there is almost no effect from the transporting of the copy by the copy transport belt 29. That is, the copy can be read with a high positional accuracy from the leading edge of the copy because the copy edge detection sensor 17 is close to the copy reading position 30b. More concretely, in the basic operation mode, there is an error of about ±2 mm between the leading edge position of the copy and the actual reading start position under the effect of the copy transport belt 29. However, in the second operation mode, there is no effect by the copy transport belt 29, so that the error is suppressed less than ±1 mm.

Generally, there are almost all cases that the user knows that a set of copies to be read are monochrome or color. Therefore, in the second operation mode, there is a merit that the copy can be read with a high positional accuracy in the case that the copy attribution has been known in advance.

Figure 4:
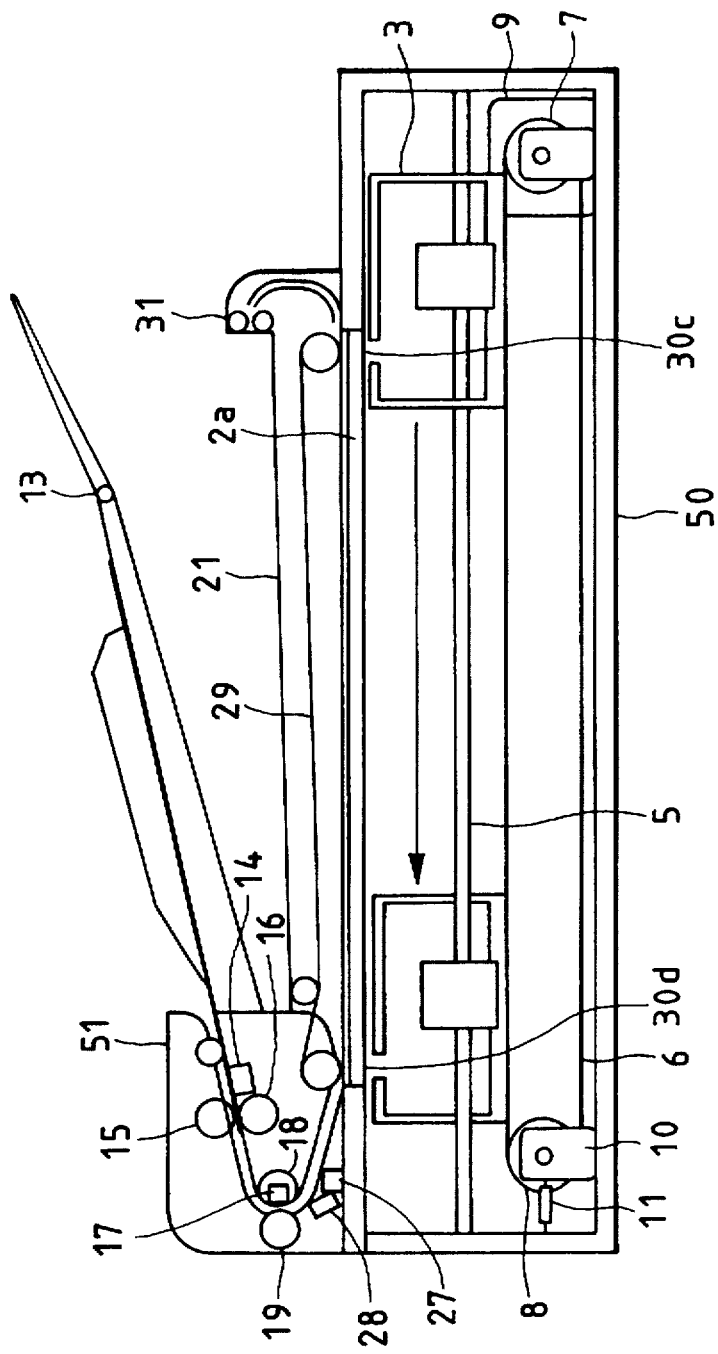
FIG. 4 is an illustration showing an operation in the third operation mode of the image reading apparatus of the embodiment of this invention.

FIG. 4 is an illustration showing an operation in the third operation mode of the image reading apparatus of an embodiment of this invention. Then, the third operation mode will be described. In FIG. 4, numeral 30c is a copy reading position in the third operation mode. The other structures and operation are the same as those of the basic operation mode mentioned above.

If the host computer 49 requires a resolution exceeding the predetermined standard value or the host computer 49 commands the third operation mode the third operation mode is performed.

In the third operation mode, when a copy is set on the copy tray 13 of the ADF unit 51 and the copy detection sensor 14 detects the copy, the drive motor 9 of the body 50 of the image reading apparatus is rotated, the drive force is transmitted to the carriage 3 through the drive pulley 7, the drive wire 6, and the slave pulley 8 such that the copy reading portion 23 of the carriage 3 moves to a position just under the copy reading position 30c.

Then, the light source lamp 22 in the carriage 3 and the light source 28 in the ADF unit 51 are turned on and at the same time, the ADF drive motor 61 is rotated. The rotation speed of the ADF drive motor 61 at the start-up timing is set to the transport speed twice the transport speed (feeding rate) of the color image copy. The transport roller 18 and the guide roller 19 are coupled to the ADF drive motor 61 through the reduction gear mechanism (not shown), so that the transport roller 18 and the guide roller 19 start to rotate with the rotation of the ADF drive motor 61. When a rotation speed of the ADF drive motor 61 reaches a constant speed, the clutch mechanism (not shown) is controlled to rotate the transport roller 15 and the reverse roller 16 to transport every copy set on the copy tray 13. The reverse roller 16 suppresses the so-called multiple transportation.

When the leading edge of the copy transported is detected by the copy edge detection sensor 17, the transmitting of the drive force to the transport roller 15 and reverse roller 16 is stopped by controlling the clutch mechanism. At this instant, the copy is pinched between the transport roller 18 and the guide roller 19 and hereinafter, the copy is transported by the transport roller 18 and the transport roller 15 acts as a tension roller.

Further, when the leading edge of the copy is detected by the copy edge detection sensor 17, in response to this, a start timing of the copy transport belt 29 is determined and when the trailing edge of the copy is detected, the stop timing of the transport belt 29 is determined. Similarly, the start and stop timings of the reading by the image sensor 27 are also determined by the detection of the leading and trailing edges of the copy by the copy edge detection sponsor 17. The image attribution judging processing of the third operation mode is the same as that of the first operation mode, so that the detailed description is omitted.

The leading edge which has passed the copy edge detection sensor 17 is transported to the copy transport belt 29. The driving of the copy transport belt 29 is controlled by the clutch mechanism and the copy transport belt 29 is driven just before the copy reaches the copy transport belt 29 and the copy is transported along the copy glass 2a. Then, when the copy is arranged over the copy glass 2a, that is, a predetermined interval has passed after the trailing edge of the copy passes the copy edge detection sensor 17, the driving of the copy transport belt 29 is stopped.

When the transporting of the copy stops completely, the carriage drive motor 9 is rotated to transmit the drive force to the carriage 3 through the drive pulley 7, the drive wire 6 and the slave pulley 8 and the copy is read as the copy reading portion 23 in the carriage is moved from the copy reading start portion 30c to the copy reading end position 30d. The moving speed of the carriage is uniquely determined because the copy attribution has been judged at the start timing of the copy by the CPU 37 and the reading conditions such as the resolution or the like are commanded by the host computer 49 before the starting up of the ADF unit 51. After the termination of the reading over the copy, the carriage 3 returns to the copy reading start position 30c. Moreover, at the same time, the copy which has been read is discharged from the copy discharge portion 31 because the copy transport belt 29 is driven again by the clutch mechanism.

As mentioned above, in the third operation mode, the image sensor 27 reads the copy, the CPU 37 executes the judgement of the copy attribution, the driving speed of the carriage 3, that is, the reading speed, is determined in accordance with the reading condition such as the resolution. Generally, from the limitation of a cost or the like, the ADF drive motor 61 provided to the ADF unit 51 has a lower drive accuracy than the drive motor 9 provided to the body 50 of the image reading apparatus. Therefore, if the copy is required to be transported slowly, the copy can be read with a high resolution and a high accuracy by scanning the copy using the drive motor 9 to drive the carriage 3. Here, the image of the copy is read by the image sensor 25 through scanning in the sub-scanning direction by a relative motion between the image of the copy and the image sensor 25 by provided by the motion by the copy transport belt 29 or/and the motion by the carriage 3.

As mentioned above, the image reading apparatus of this invention can change operation modes other than the first operation mode in accordance with the command from the host computer 49. Therefore, in any using condition, it can provide a good picture quality always.

Moreover, in the above-mentioned description, the judgement of the copy attribution is made among color image (multi-value image)/monochrome image (multi-value image)/monochrome 8 binary image). However, the judgement may be made between the multi-value image/binary image and between color/monochrome to provide a similar effect.

Moreover, in this embodiment, a color image sensor and the fluorescent lamp are used. However, if the copy attribution is Judged only between the multi-value and binary images, a combination of a monochrome image sensor and an LED array can be used.

As mentioned, the reading condition such as the charge accumulating interval, the feeding rate, or the cycle of the main scanning direction is change in accordance with the attribution of the image of the copy which is obtained from the second image sensor or the attribution command signal.

As mentioned, this invention provides an image reading apparatus comprising: a scanner portion, having a first line image sensor 25, a carriage system carrying the first line image sensor; and an ADF unit 51, having a transporting pass for feeding a copy from a stacked copies and carrying the copy from a first end 30b of a copy glass of the scanner and discharging the copy at the second end 30a of the scanner, the ADF unit 51 further having an attribution detection portion, including a second line image sensor 27, for detecting an attribution of an image of the copy, such as a color image or monochrome image, or a multi-value image or binary image. According to the attribution, a reading speed or the reading interval (the cycle or the charging interval) by the first line image sensor 25 is changed. In the absence of a command signal indicative of the attribution, the first line image sensor 25 is positioned at the second end 30a and in the presence of the command signal, the first line image sensor 25 is positioned at the first end 30b. If a high resolution is required, a copy fed to the copy glass 2a is scanned by the carriage system with a scanning speed and resolution determined by the request and the detection result of the attribution detection portion.

According to the present invention there is also provided an image reading apparatus for outputting an image signal comprising: a transporting portion, having a transporting pass, for transporting a copy along the transporting pass in a sub-scanning direction at a predetermined feeding rate; a first image reading portion, provided on the way of the transporting pass for reading an image on the copy through scanning the image in a main scanning direction at a cycle to produce the image signal; a second image reading portion, provided on the way of the transporting pass upstream from the first image reading portion, for reading the image; an attribution detection portion for detecting an attribution of the image on the basis of an output of the second image reading portion; and a control portion for changing the cycle in accordance with the detected attribution. In accordance with the detected attribution, the feeding rate may be changed. After the detection of the attribution, the first image reading portion may read the image to produce the image signal through scanning in the sub-scanning direction by a carriage wherein a scanning speed in the sub-scanning direction is changed in accordance with the detected attribution. Further, a resolution of the scanning may be changed in the scanning by the carriage in accordance with a resolution command signal in addition to the attribution.

The attribution is detected with respect to whether the image is a color image or a monochrome image, or a multi-value image or a binary image.

When the attribution is detected, the first and second image reading portions are separated more than a maximum length of the copy in the sub-scanning direction at the start timing of reading. Therefore, the carriage is positioned at an end position of a carriage stroke (scanning stroke) far from the second image reading portion.

When the attribution is not detected, or a command signal indicative of the attribution is inputted, the first image reading portion is positioned at the other end position of the carriage stroke nearest to the second image reading portion to provide an accurate image reading.

What is claimed is:

1. An image reading apparatus for outputting an image signal comprising:

a transporting portion, having a transporting pass, for transporting a copy along said transporting pass in a sub-scanning direction at a predetermined feeding rate;

a first image reading portion, provided on the way of said transporting pass for reading an image on said copy through scanning said image in a main scanning direction in a scanning cycle to produce said image signal when said transporting portion is transporting said copy;

a second image reading portion, provided on the way of said transporting pass upstream from said first image reading portion, for reading said image;

a statistic amount measuring portion for accumulating samples of said image from an output of said second image reading portion to determine a statistical quantity relating to said image;

an attribution detection portion for detecting an attribution of said image on the basis of said measured statistic quantities; and a control portion for changing said cycle in accordance with an output of said attribution detection portion.

2. An image reading apparatus as claimed in claim 1, wherein said attribution detection portion detects whether said attribution is color or monochrome.

3. An image reading apparatus as claimed in claim 2, wherein said attribution detection portion further detects whether said attribution is a binary image or a multi-value image.

4. An image reading apparatus as claimed in claim 1, wherein said attribution detection portion detects whether said attribution is a binary image or a multi-value image.

5. An image reading apparatus as claimed in claim 1, wherein said first and second image reading portions are provided with a distance which is larger than a length of said copy in said sub-scanning direction.

6. An image reading apparatus for outputting an image signal comprising:

a transporting portion, having a transporting pass, for transporting a copy along said transporting pass in a sub-scanning direction at a feeding rate of said copy;

a first image reading portion, provided on the way of said transporting pass for reading an image on said copy through scanning said image in a main scanning direction to produce said image signal when said transporting portion is transporting said copy;

a second image reading portion, provided on the way of said transporting pass upstream from said first image reading portion, for reading said image;

a statistic amount measuring portion for accumulating samples of said image from an output of said second image reading portion to determine a statistical quantity relating to said image;

an attribution detection portion for detecting an attribution of said image on the basis of measured statistic quantity; and a control portion for changing said feeding rate in accordance with an output of said attribution detection portion.

7. An image reading apparatus as claimed in claim 6, wherein said attribution detection portion detects whether said attribution is color or monochrome.

8. An image reading apparatus as claimed in claim 7, wherein said attribution detection portion further detects whether said attribution is a binary image or a multi-value image.

9. An image reading apparatus as claimed in claim 6, wherein said attribution detection portion detects whether said attribution is a binary image or a multi-value image.

10. An image reading apparatus as claimed in claim 6, wherein said first and second image reading portions are provided with a distance which is larger than a length of said copy in said sub-scanning direction.

11. An image reading apparatus for outputting an image signal comprising:

a transporting portion, having a transporting pass, for transporting a copy along said transporting pass in a sub-scanning direction at a feeding rate;

a scanning unit, provided on the way of said transporting pass, having a first image reading portion, a predetermined reading area, and a carriage portion for carrying said first image reading portion, for scanning said copy transported to said predetermined reading area by said transporting portion to produce said image signal by said first image reading portion being carried along said sub-scanning direction by said carriage portion;

a second image reading portion, provided upstream of said transporting pass from said scanning unit, for reading said image on said copy being transported by said transporting portion;

an attribution detection portion for detecting an attribution of said image on the basis of an output of said second image reading portion; and a control portion for changing the scanning speed in accordance with an output of said attribution detection portion.

12. An image reading apparatus as claimed in claim 11, wherein said attribution detection portion detects whether said attribution is color or monochrome.

13. An image reading apparatus as claimed in claim 12, wherein said attribution detection portion detects further whether said attribution is a binary image or a multi-value image.

14. An image reading apparatus as claimed in claim 11, wherein said attribution detection portion detects whether said attribution is a binary image or a multi-value image.

15. An image reading apparatus as claimed in claim 3, wherein said second image reading portion is located with a distance from a position at which said first image reading portion begins to scan said copy, said distance being larger than a length of said copy in said sub-scanning direction.

16. An image reading apparatus for outputting an image signal comprising:

a copy receiving portion for receiving a copy;

a detector for detecting the presence/absence of said copy in said copy receiving portion;

a receiving portion for receiving an attribution command signal indicative of an attribution of said copy and a start signal;

a transporting portion, having a transporting pass, for transporting said copy from said copy receiving portion along said transporting pass in a sub-scanning direction;

a scanning unit, provided on the way of said transporting pass, having a first image reading portion, a transparent portion forming a portion of said transporting portion, and a carriage portion for carrying said first image reading portion along said transparent portion in said sub-scanning direction, said scanning unit scanning said copy being transported by said transporting portion along said sub-scanning direction using said first image reading portion through said transparent portion and positioning said first image reading portion;

a second image reading portion, provided upstream of said transporting pass from said scanning unit, for reading an image on said copy being transported by said transporting portion;

an attribution detection portion for detecting an attribution of said image on the basis of an output of said second image reading portion; and a control portion for positioning said first reading portion at a first position, operating said transporting portion and said first reading portion to read said copy at said first position, and changing a feeding rate of said transporting portion in accordance with said receiving attribution command signal when said receiving portion receives said attribution command signal and said detector detects the presence of said copy, and for positioning said first reading portion at a second position, upstream from said first position with respect to said transporting pass operating said first reading portion to read said copy at said second position, and changing said feeding rate in accordance with said output of said attribution detection portion when said detector detects the presence of said copy but said receiving portion does not receive said attribution command signal, said first position is downstream from said second position with respect to said transporting pass.

17. An image reading apparatus for outputting an image signal comprising:

a copy receiving portion for receiving a copy;

a receiving portion for receiving an attribution command signal indicative of an attribution of said copy;

a transporting portion, having a transporting pass, for transporting said copy from said copy receiving portion along said transporting pass in a sub-scanning direction at a feeding rate;

a scanning unit for scanning an image of said copy, said scanning unit provided on the way of said transporting pass, having a first image reading portion, a transparent portion forming a portion of said transporting portion, and a carriage portion, having a scanning stroke along said transparent portion, for carrying said first image reading portion in said sub-scanning direction, said first image reading portion reading said image through said transparent portion in a main scanning direction and in said sub-scanning direction with a relative motion between said first image reading portion and said copy, and for positioning said first image reading portion;

a second image reading portion, provided upstream of said transporting pass from said scanning unit, for reading said image on said copy being transported by said transporting portion;

an attribution detection portion for detecting an attribution of said image on the basis of an output of said second image reading portion; and a control portion responsive to a start command signal and said received attribution command signal;

for operating said scanning unit to position said first reading portion at a first position within said scanning stroke and then, scan said image and changing said cycle in accordance with a received attribution command signal when said receiving portion receives said attribution command signal and said control portion receives said start signal; and for operating said scanning unit to position said first reading portion at a second position within said scanning stroke upstream with respect to said transporting pass and then, scan said image and changing said cycle in accordance with an output of said attribution detection portion when said control portion receives said start signal and said receiving portion does not receive said attribution command signal.

18. An image reading apparatus as claimed as claim 17 further comprising:

a detector for detecting said copy in said copy receiving portion and producing said start signal in response to the detection of said copy.

19. An image reading apparatus for outputting an image signal comprising:

a copy receiving portion for receiving a copy;

a command receiving portion for receiving a command signal indicative of a scanning resolution;

a transporting portion, having a transporting pass, for transporting said copy from said copy receiving portion along said transporting pass in a sub-scanning direction at a feeding rate;

a scanning unit, provided along said transporting pass, having a first image reading portion, a transparent portion, and a carriage portion for carrying said first image reading portion along said transparent portion in said sub-scanning direction, for scanning said copy on said transparent portion transported by said transporting portion using said carriage portion and said first image reading portion;

a second image reading portion, provided upstream of said transporting pass from said scanning unit, for reading an image on said copy being transported by said transporting portion;

an attribution detection portion for detecting a second attribution of said image on the basis of an output of said second image reading portion; and a control portion for operating said scanning unit to read said image and changing a speed of said carriage portion in accordance with an output of said attribution detection portion and said received command signal.

20. An image reading apparatus for outputting an image signal comprising:

a transporting portion, having a transporting pass, for transporting a copy along said transporting pass in a sub-scanning direction;

a first image reading portion, provided along said transporting pass for reading an image on said copy through scanning said image in a main scanning direction in accordance with a reading condition to produce said image signal and in subscanning direction with a relative motion between said first image reading portion and said copy;

a second image reading portion, provided on the way of said transporting pass upstream from said first image reading portion, for reading said image;

a statistic amount measuring portion for accumulating samples of said image from an output of said second image reading portion to determine a statistical quantity relating to said image;

an attribute detection portion for detecting an attribution of said image on the basis of said measured statistical quantities; and a control portion for changing said reading condition in accordance with an output of said attribute detection portion.

* * * * *